US006107975A

United States Patent [19]

Brennan et al.

[11] Patent Number: 6,107,975

[45] Date of Patent: Aug. 22, 2000

[54] PROGRAMMABLE ANTENNA

[75] Inventors: Joseph E. Brennan, Annapolis; Celia Webb, Severn, both of Md.

[73] Assignee: The United States of America as represented by the National Security Agency, Washington, D.C.

[21] Appl. No.: 09/345,606

[22] Filed: Jun. 28, 1999

[51] Int. Cl.$^7$ .................... G06T 17/40

[52] U.S. Cl. .................... 343/853; 364/578

[58] Field of Search .................... 364/578, 512; 343/853

[56] References Cited

U.S. PATENT DOCUMENTS

| | | | |
|---|---|---|---|
| 5,719,794 | 2/1998 | Altshuler | 364/578 |
| 5,867,397 | 2/1999 | Koza et al. | 364/489 |
| 5,914,906 | 6/1995 | Iadanza et al. | 365/230.03 |

OTHER PUBLICATIONS

Nathan Cohen, "Fractal Antennas Part 1", Communications Quarterly, Summer 1995.

Nathan Cohen and Robert 6. Hohlfela, "Fractal Loops And The Small Loop Approximation, " Communications Quarterly, Winter 1996.

*Primary Examiner*—Don Wong
*Assistant Examiner*—James Clinger
*Attorney, Agent, or Firm*—Robert D. Morelli

[57] ABSTRACT

The present invention is a programmable antenna that includes a plane and a plurality of programmable arrays on the plane, where the plurality of programmable arrays are connected together in cross-point fashion for programming a user-definable antenna shape therein. The programmable arrays may be programmed before or after being placed on the plane. If the programmable arrays are to be programmed while on the plane then a controller is connected to the programmable arrays to program them. A plurality of planes may be used to realize a three-dimensional programmable antenna.

8 Claims, 3 Drawing Sheets

PROGRAMMABLE ANTENNA

FIELD OF THE INVENTION

The present invention relates, in general, to communication using a radio wave antenna and, in particular, to an adjustable length antenna.

BACKGROUND OF THE INVENTION

Current antenna technology results in fixed-length, or finite and manual-adjustment, antennas that are at least one quarter of a wavelength in length or antennas that include an electrical load. Using current technology, an antenna may range in length from inches for a super high frequency antenna to miles for an extremely low frequency antenna. A large antenna presents logistic problems and requires more power to operate than does a small antenna. Tactical and mobile communication systems require antennas that have high gain, are small, are lightweight, and use little electrical power.

In two articles, the first by Nathan Cohen and the second by Nathan Cohen and Robert G. Hohlfeld, entitled "Fractal Antennas Part 1," published in the summer of 1995 by *Communications Quarterly* on pages 7–22, and "Fractal Loops and the Small Loop Approximation," published in the winter of 1996 by *Communications Quarterly* on pages 77–81, the use of fractals in the design of antennas is described. A fractal is a pattern that includes a certain pattern replicated a number of times at different sizes so that the fractal has the same pattern as the certain pattern replicated therein. Typically, antenna designers use classic Euclidean geometry (e.g., simple squares and triangles) to design the shape of an antenna to obtain certain antenna characteristics. A fractal pattern with its more intricate shape and finer resolution (e.g., snowflake pattern) provides greater options and control to the antenna designer to obtain certain antenna characteristics. Antennas designed by the method disclosed in these articles are not re-programmable (i.e., reconfigurable) as is the antenna of the present invention.

U.S. Pat. No. 5,719,794, entitled "PROCESS FOR THE DESIGN OF ANTENNAS USING GENETIC ALGORITHMS," discloses a method of having a computer design an antenna to a user-definable specification by having the computer select user-definable design options, testing the particular antenna resulting from the selection, and refining the design using additional selections until the resulting antenna meets the specification defined by the user. Antennas is using the method of U.S. Pat. No. 5,719,794 are not re-programmable (i.e., reconfigurable) as is the present invention. U.S. Pat. No. 5,719,794 is hereby incorporated by reference into the specification of the present invention.

The problem with fixed-length, or finite and manual-adjustment, antennas is that they may not meet the desired characteristics, be too large, be too heavy, and consume too much electrical power. Fixed antennas that employ fractal patterns provide a greater chance of meeting a particular characteristic, but may not be adjustable to allow either fine-tuning of the antenna or completely changing the characteristics of the antenna. The present invention is a solution to the problems associated with the above-identified antennas.

SUMMARY OF THE INVENTION

It is an object of the present invention to program an antenna to a user-definable antenna shape.

It is another object of the present invention to program an antenna to a user-definable antenna shape using at least one plane of cross-connected programmable arrays.

It is another object of the present invention to program an antenna to a user-definable fractal pattern.

The present invention is a programmable antenna that may be programmed to a user-definable shape. The programmable antenna includes a plane and a user-definable number of programmable arrays on the plane. The programmable arrays are connected together in cross-point fashion.

The programmable arrays are commercially available and come in different configurations. In one configuration, the programmable array is programmed prior to being placed in the plane. In another configuration, the programmable array may be programmed while in the plane. For programmable arrays that may be programmed while in the plane, a controller must be connected to the programmable arrays to program them.

In an alternate embodiment, a plurality of planes of programmable arrays may be used to realize a three-dimensional antenna.

DETAILED DESCRIPTION

Figure 1:
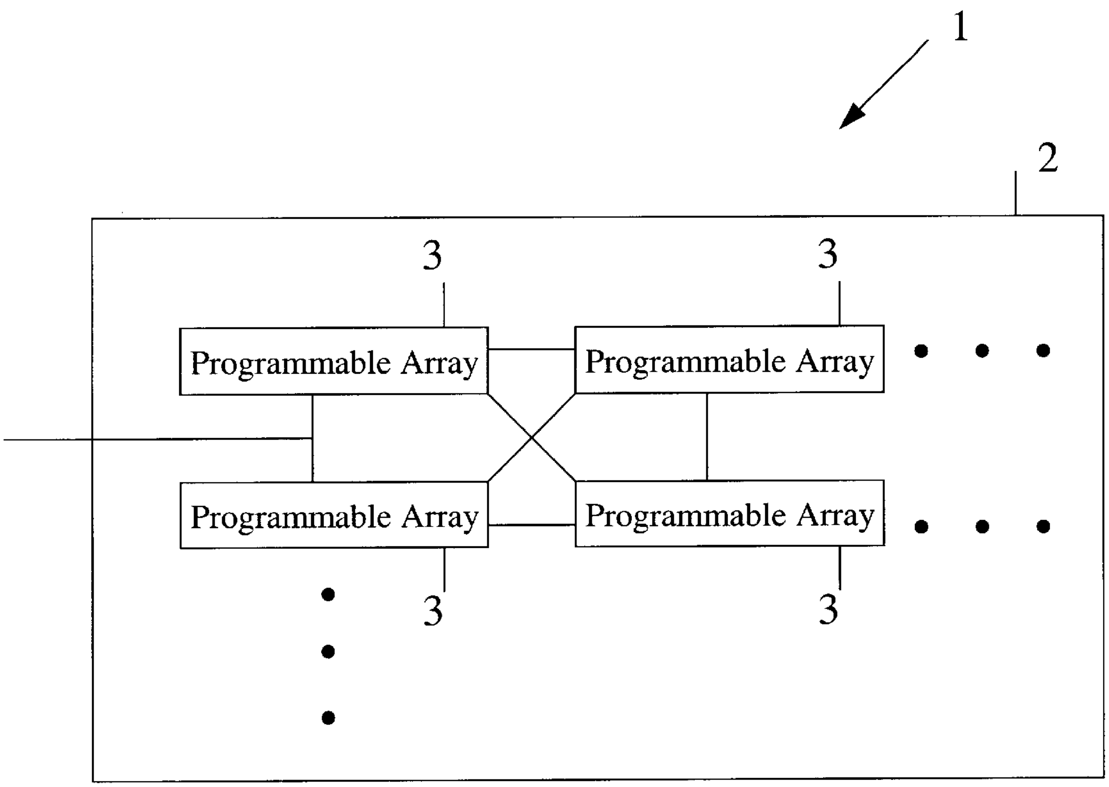
FIG. 1 is an top view of a programmable antenna using one plane.

The present invention is a programmable antenna that may be programmed to a user-definable shape. The shape of an antenna determines its characteristics. FIG. 1 is a top-view of a programmable antenna 1 of the present invention that is realized using a single plane 2. The single plane 2 includes a user-definable number of programmable arrays 3 connected together in cross-point fashion. That is, each programmable array 3 is connected to its nearest neighbors vertically, horizontally, and diagonally.

Each programmable array 3 includes an array of elements that may be programmed to realize a wire length and shape of near infinite variety. Such programmable arrays are commercially available such as a matrix switch. Any other device that may be programmed to achieve a user-definable signal path may be used in the present invention. Connectivity of the programmable arrays 3 to neighboring programmable arrays 3 is user-definable and is implemented during programming.

The desired shape of the antenna is programmed into the programmable arrays 3, collectively. The shape of the antenna may be programmed to a classical Euclidean geometry, a fractal pattern, a multi-fractal pattern, or any combination thereof. The use of a fractal pattern tends to reduce the size of the antenna for certain antenna characteristics and also provides greater tuning capability to achieve the desired characteristics.

Figure 2:
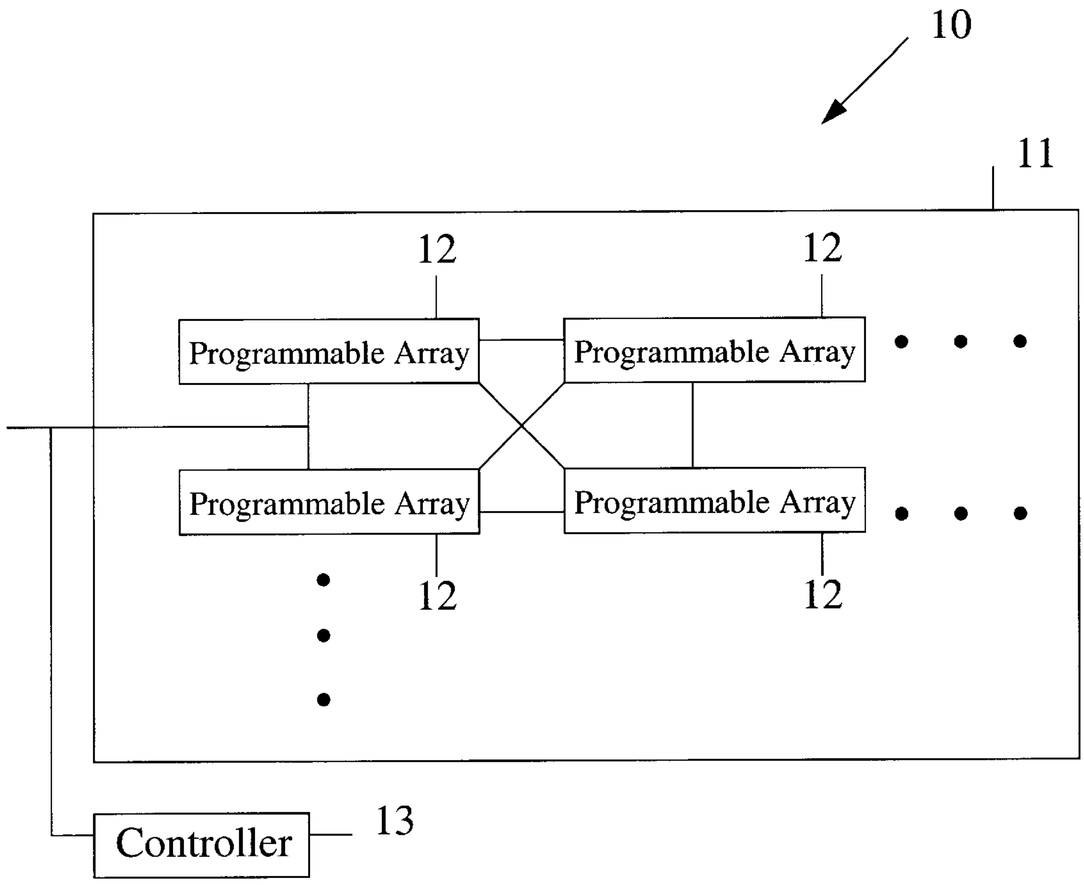
FIG. 2 is a top view of the programmable antenna of FIG. 1 using programmable arrays that may be programmed while in the plane.

The programmable arrays 3 must be programmed prior to being placed on the plane 2. Programmable arrays that may be programmed while on the plane 2 are preferred since they allow greater flexibility in changing from one antenna design to another without having to remove the programmable arrays from the plane 2. FIG. 2 is a top view of a programmable antenna 10 consisting of a single plane 11 on which there are a number of on-plane programmable arrays 12, where the on-plane programmable arrays 12 may be programmed while on the plane 11. On-plane programmable arrays 12 are commercially available. The on-plane programmable arrays 12 are used in place of, and are connected in similar fashion as, the programmable arrays 3 of FIG. 1. A controller 13 in FIG. 2 is connected to the on-plane programmable arrays 12 to program them.

Figure 3:
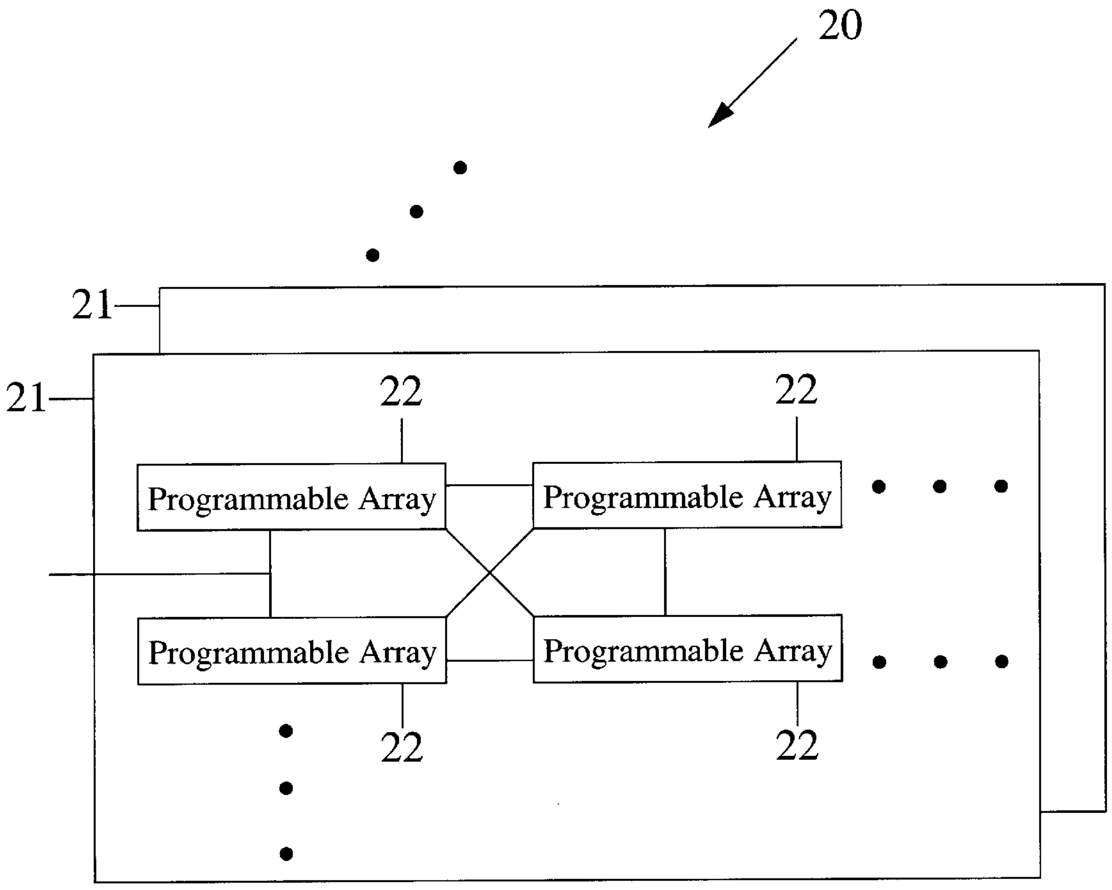
FIG. 3 is a top perspective view of the present invention using multiple planes.

FIG. 3 is an alternate embodiment of a programmable antenna 20 consisting of a plurality of planes 21 of programmable arrays 22. The programmable arrays 22 are connected as are the programmable arrays 3 of FIG. 1. By adding additional planes 21 in FIG. 3, the programmable antenna 20 becomes three dimensional whereas the programmable antennas 1, 10 of FIGS. 1 and 2 are two dimensional. The programmable antenna 20 of FIG. 3 allows a user to program a near infinite number of three-dimensional antenna shapes.

The present invention may be used in conjunction with a fixed antenna to fine tune the characteristics of the fixed antenna.

What is claimed is:

1. A programmable antenna, comprising:

a) a plane; and b) a plurality of programmable arrays on the plane, where the plurality of programmable arrays are connected together in cross-point fashion for programming a user-definable antenna shape therein.

2. The device of claim 1, wherein each of said plurality of programmable arrays is a matrix switch.

3. A programmable antenna, comprising:

a) a plane;

b) a plurality of programmable arrays on the plane, where the plurality of programmable arrays are connected together in cross-point fashion; and c) a controller connected to the plurality of programmable arrays for programming a user-definable antenna shape in the plurality of programmable arrays.

4. The device of claim 3, wherein each of said plurality of programmable arrays is a matrix switch.

5. A programmable antenna, comprising:

a) a plurality of planes; and b) a plurality of programmable arrays on the plurality of planes, where the plurality of programmable arrays are connected together in cross-point fashion for programming a user-definable antenna shape therein.

6. The device of claim 5, wherein each of said plurality of programmable arrays is a matrix switch.

7. A programmable antenna, comprising:

a) a plurality of planes;

b) a plurality of programmable arrays on the plurality of planes, where the plurality of programmable arrays are connected together in cross-point fashion; and c) a controller connected to said plurality of programmable arrays for programming a user-definable antenna shape in the plurality of programmable arrays.

8. The device of claim 7, wherein each of said plurality of programmable arrays is a matrix switch.

* * * * *